(12) United States Patent
Kim

(10) Patent No.: US 7,596,884 B2
(45) Date of Patent: Oct. 6, 2009

(54) CLOTHING DRYER

(75) Inventor: Won-Tae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 11/126,148

(22) Filed: May 11, 2005

(65) Prior Publication Data

US 2005/0278971 A1    Dec. 22, 2005

(30) Foreign Application Priority Data

Jun. 16, 2004   (KR) ...................... 10-2004-0044320
Jun. 16, 2004   (KR) ...................... 10-2004-0044321

(51) Int. Cl.
*F26B 11/02* (2006.01)
(52) U.S. Cl. .......................................... 34/140; 34/235
(58) Field of Classification Search ................ 34/91, 34/201, 202, 218, 235, 239, 601, 603, 604, 34/607, 140; 248/73, 220.21, 222.52, 300; 285/401, 376, 31; 403/347–349, 353

See application file for complete search history.

(56) References Cited

U.S. PATENT DOCUMENTS 3,415,472 A * 12/1968 Hien ......................... 248/27.3
5,042,172 A *  8/1991 Foco et al. .................... 34/235
6,170,882 B1 *  1/2001 Prest ........................... 285/12

FOREIGN PATENT DOCUMENTS

| EP | 1 270 793 | 1/2003 | |
|----|-----------|--------|---|
| GB | 2 357 117 | 6/2001 | |
| JP | 60242898 A * | 12/1985 | .................. 34/602 |
| JP | 09039587 A * | 2/1997 | |

* cited by examiner

*Primary Examiner*—Jiping Lu
(74) *Attorney, Agent, or Firm*—Staas & Halsey LLP

(57) ABSTRACT

A clothing dryer including: a housing; an exhaust pipe; a first fixing bracket disposed at the exhaust pipe; and a second fixing bracket disposed at the bottom of the housing, the first fixing bracket being fitable in the second fixing bracket. The exhaust pipe is fixed without using an additional fixing member, whereby assembly and disassembly of the clothing dryer are accomplished.

5 Claims, 5 Drawing Sheets

CLOTHING DRYER

CROSS-REFERENCE TO RELATED APPLICATIONS

This application claims the benefit of Korean Patent Application No. 2004-44320, filed on Jun. 16, 2004 and Korean Patent Application No. 2004-44321, filed on Jun. 16, 2004 in the Korean Intellectual Property Office, the disclosures of which are incorporated herein by reference.

BACKGROUND OF THE INVENTION

1. Field of the Invention

The present invention relates to a clothing dryer, and, more particularly, to an exhaust pipe fixing structure of the clothing dryer.

2. Description of Related Art

A clothing dryer is a machine that supplies hot air to a drying tub, in which wet clothing is places, to evaporate moisture contained in the clothing, thereby drying the clothing. A conventional clothing dryer includes: a housing forming an external appearance of the clothing dryer; a drying tub rotatably mounted in the housing; an inlet duct to introduce hot air to the drying tub, an outlet duct to discharge hot air from the drying tub, a blowing fan to generate a blowing force necessary to introduce and discharge hot air; an exhaust pipe to discharge air blown from the blowing fan out of the clothing dryer; and a driving motor to drive the blowing fan and the drying tub.

In such a clothing dryer, the front end of the exhaust pipe is supportably disposed in a locating part formed at the exit of a fan casing of the blowing fan, the middle part of the exhaust pipe is supported by a fixing bracket attached to the bottom of the housing, and the rear end of the exhaust pipe is supported by a rear cover while being inserted through an opening formed at the rear surface of the housing.

The fixing bracket, which supports the middle part of the exhaust pipe, has one end attached to the outer circumference of the exhaust pipe by a rivet of a screw and the other end attached to the bottom of the housing by a screw. Consequently, it is necessary that an additional fixing member be used to attach the fixing bracket to the bottom of the housing when the exhaust pipe is to be assembled. Also, it is necessary that the fixing member attached to the fixing bracket be removed when the exhaust pipe is to be disassembled, which complicates the disassembling operation of the exhaust pipe.

BRIEF SUMMARY

It is an aspect of the invention to provide a clothing dryer having an exhaust pipe, which is easily fixed without using an additional fixing member, whereby assembly and disassembly of the clothing dryer are easily and conveniently accomplished.

According to an aspect of the present invention, there is provided a clothing dryer including: a housing; an exhaust pipe; a first fixing bracket disposed at the exhaust pipe; and a second fixing bracket disposed at the bottom of the housing, the first fixing bracket being fitable in the second fixing bracket.

The first fixing bracket may be provided with a latching part, the second fixing bracket may be provided with a latching groove, and the latching part may be fitted in the latching groove.

The first fixing bracket may be fitted into or separated from the second fixing bracket as the exhaust pipe is rotated about its central axis.

The latching groove may be formed in the rotating direction of the latching part.

The first fixing bracket may further include: an attachment part attached to the outer circumference of the exhaust pipe; and an extension part extending from the attachment part in the radial direction of the exhaust pipe 30, the latching part being bent from the end of the extension part.

The second fixing bracket may further include: an attachment part attached to the bottom of the housing; and an extension part extending upward from the attachment part, and the latching groove may be formed at the extension part.

The clothing dryer may further include: a third fixing bracket disposed at the rear end of the exhaust pipe, the third fixing bracket having a protrusion part protruded toward the rear surface of the housing, and the housing is provided at the rear surface thereof with a fixing hole that allows the protrusion part to be fitted therein.

The third fixing bracket may further include: an attachment part attached to the outer circumference of the exhausting pipe; and an extension part extending from the attachment part in the radial direction of the exhaust pipe, the protrusion part being bent rearward from the extension part.

According to another embodiment of the present invention, there is provided a clothing dryer including: a housing; an exhaust pipe; and a fixing bracket disposed at the rear end of the exhaust pipe, the fixing bracket having a protrusion part protruded toward the rear surface of the housing. The housing has, at the rear surface thereof, a fixing hole which accepts the protrusion part, and, when the exhaust pipe is not correctly assembled, the protrusion part does not fit into the fixing hole.

According to another aspect of the present invention, there is provided a method of assembling an exhaust pipe, including: inserting a front end of the exhaust pipe into a locating part; rotating the exhaust pipe about an axis thereof such that a latching part of a first fixing bracket attached thereto is fitted into a latching groove of a second fixing bracket attached to housing; attaching a rear cover to a rear surface of the housing; and attaching a third fixing bracket attached to a rear end of the exhaust pipe to the rear cover.

According to another embodiment of the present invention, there is provided an exhaust pipe assembly for a clothing dryer, including: a first fixing bracket attached to the exhaust pipe and having a latching part; and a second fixing bracket attached to a housing of the clothing dryer, which receives the first fixing bracket when the exhaust pipe is rotated, and which has a latching groove which extends in a rotating direction of the latching part such that the latching part is fitted into or separated from the latching groove when the exhaust pipe is rotated about a axis thereof in first or second directions, respectively.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
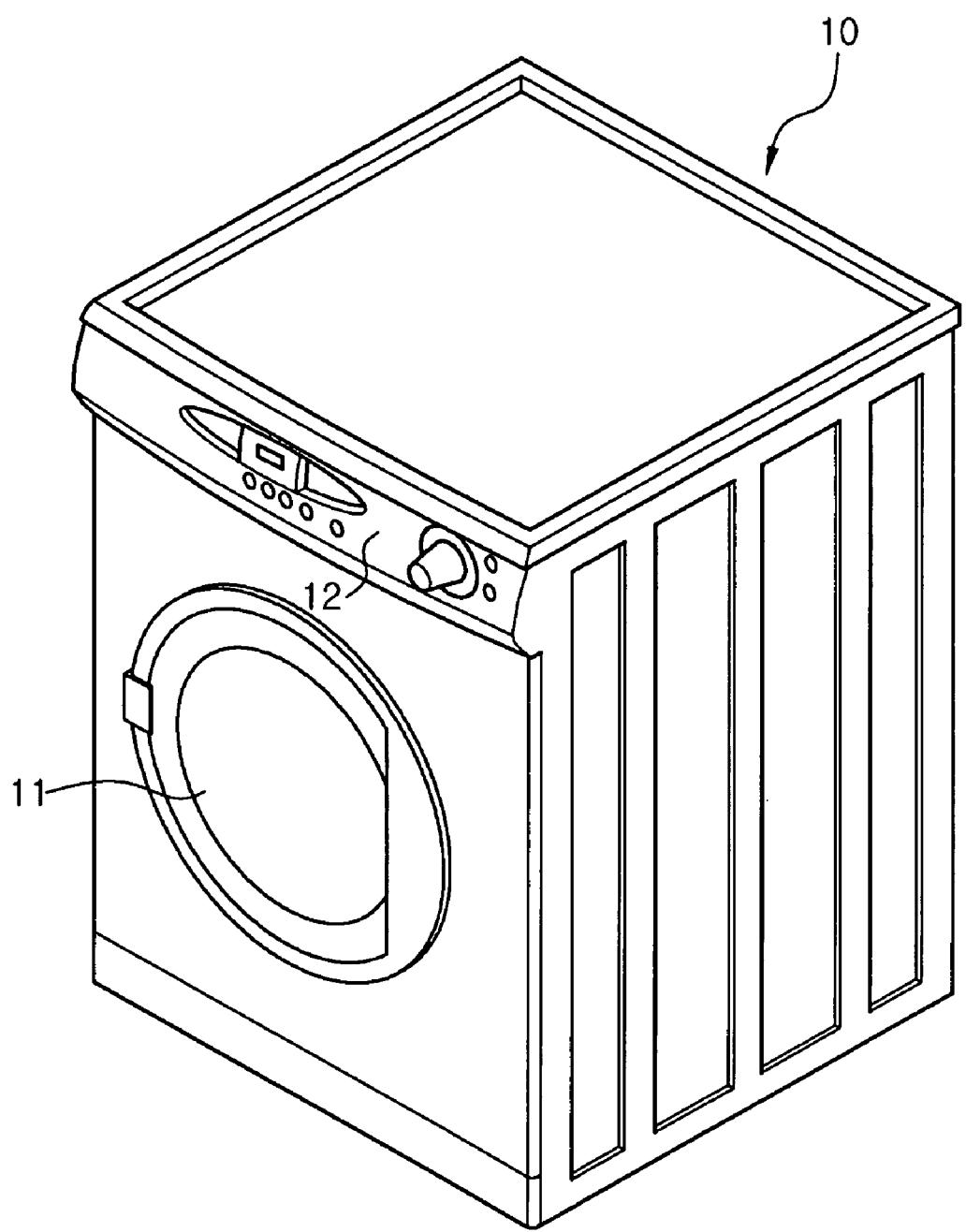
FIG. 1 is a perspective view showing the external appearance of a clothing dryer according to an embodiment of the present invention.

Reference will now be made in detail to an embodiment of the present invention, examples of which are illustrated in the accompanying drawings, wherein like reference numerals refer to like elements throughout. The embodiment is described below to explain the present invention by referring to the figures.

FIG. 1 is a perspective view showing the external appearance of a clothing dryer according to an embodiment of the present invention. As is shown in FIG. 1, the clothing dryer includes a housing 10 forming the external appearance of the clothing dryer. The housing 10 is formed substantially in the shape of a hexahedron. The housing 10 is provided at the front part thereof with a door 11, and at the upper part thereof with a control unit 12 that controls the operation of the clothing dryer.

Figure 2:
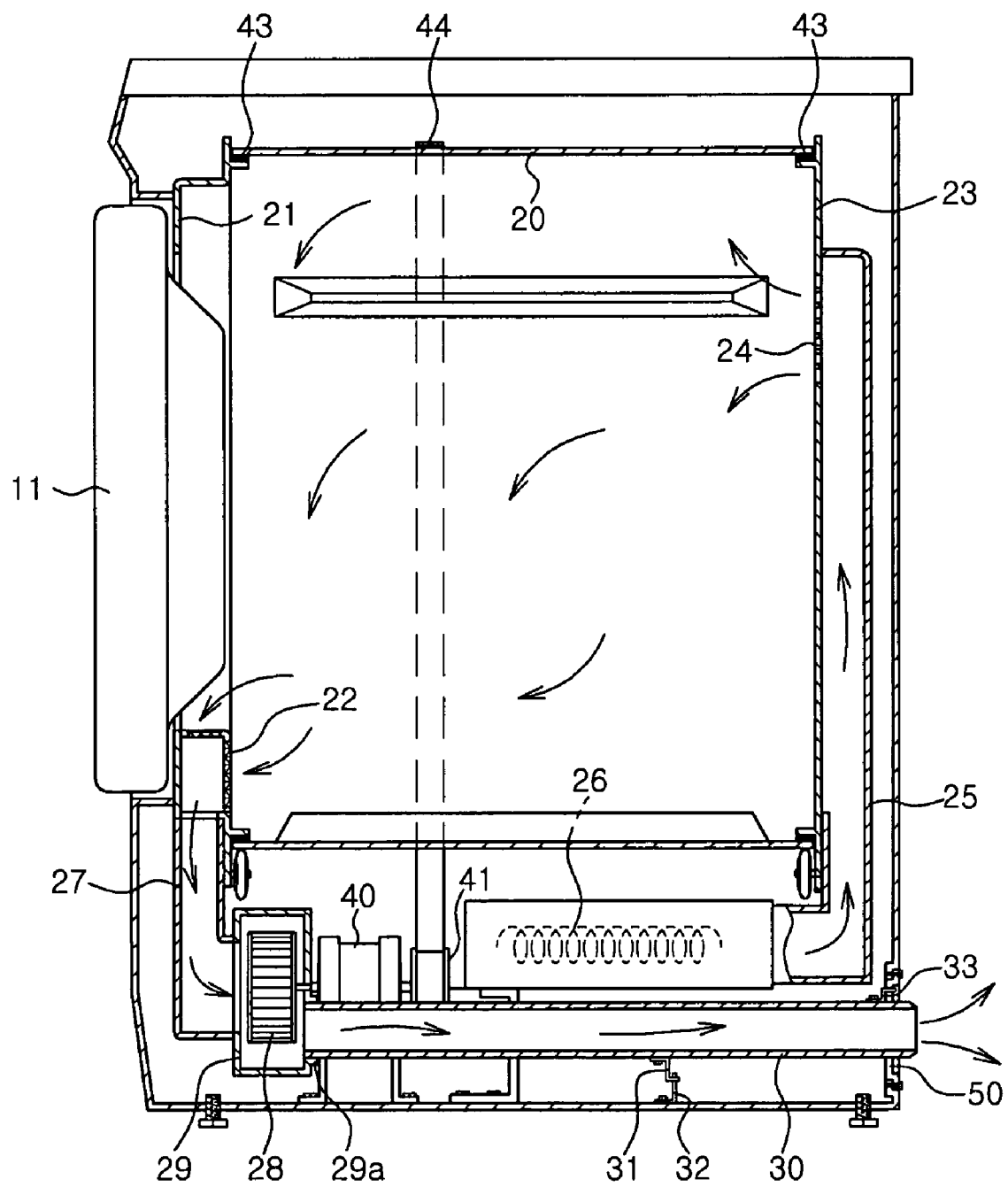
FIG. 2 is a side view, in section, showing the clothing dryer of FIG. 1.
Figure 3:
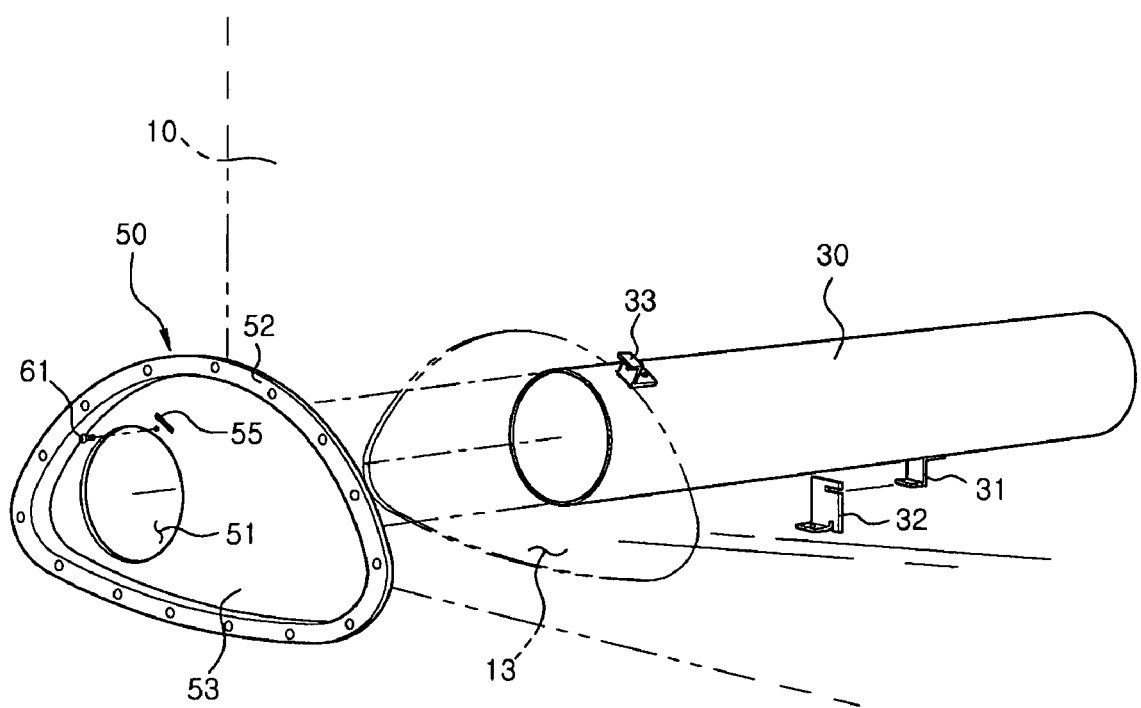
FIGS. 3 to 5 are perspective views showing an exhaust pipe fixing structure of the clothing dryer of FIG. 1.
Figure 4:
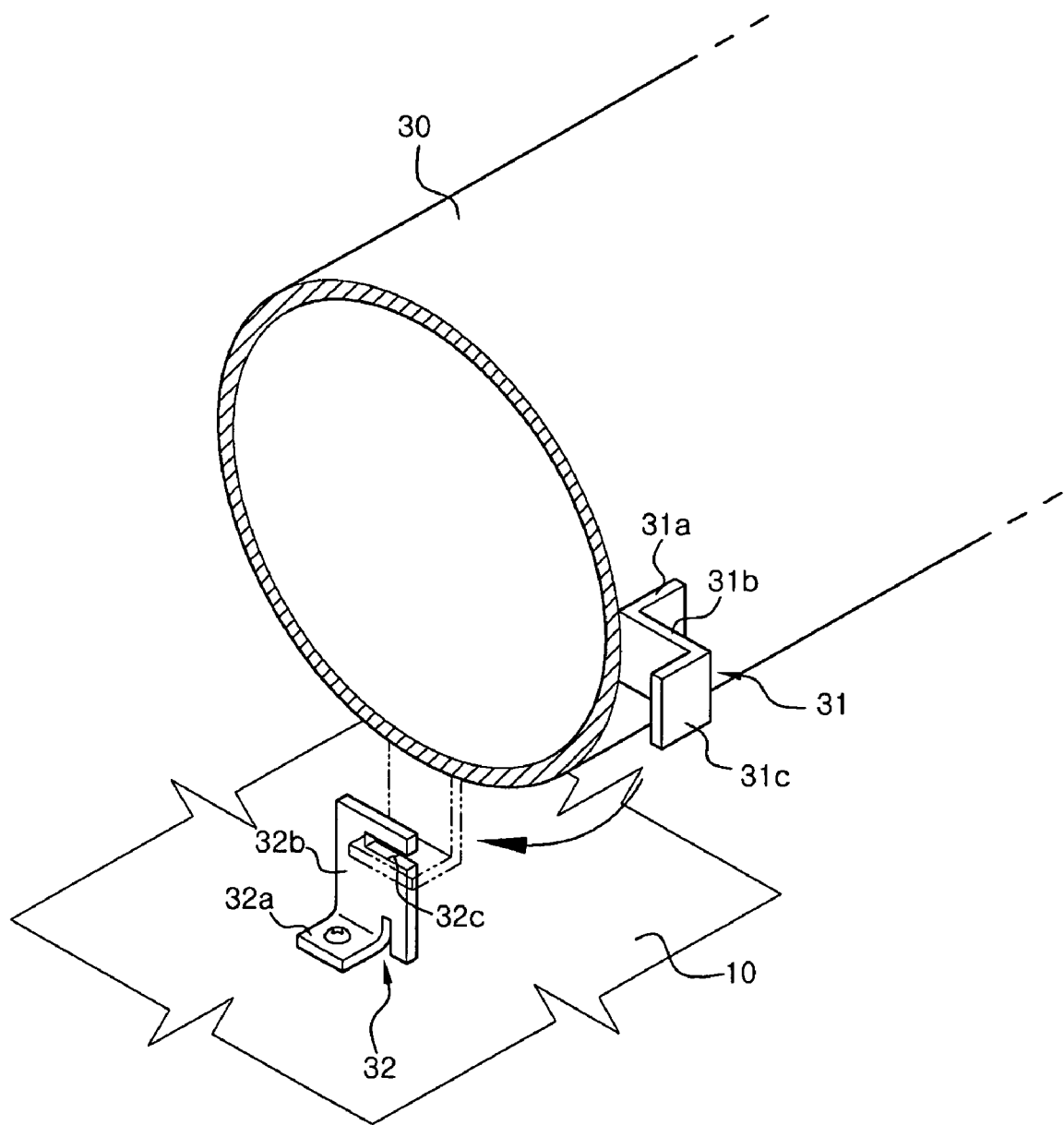
Figure 5:
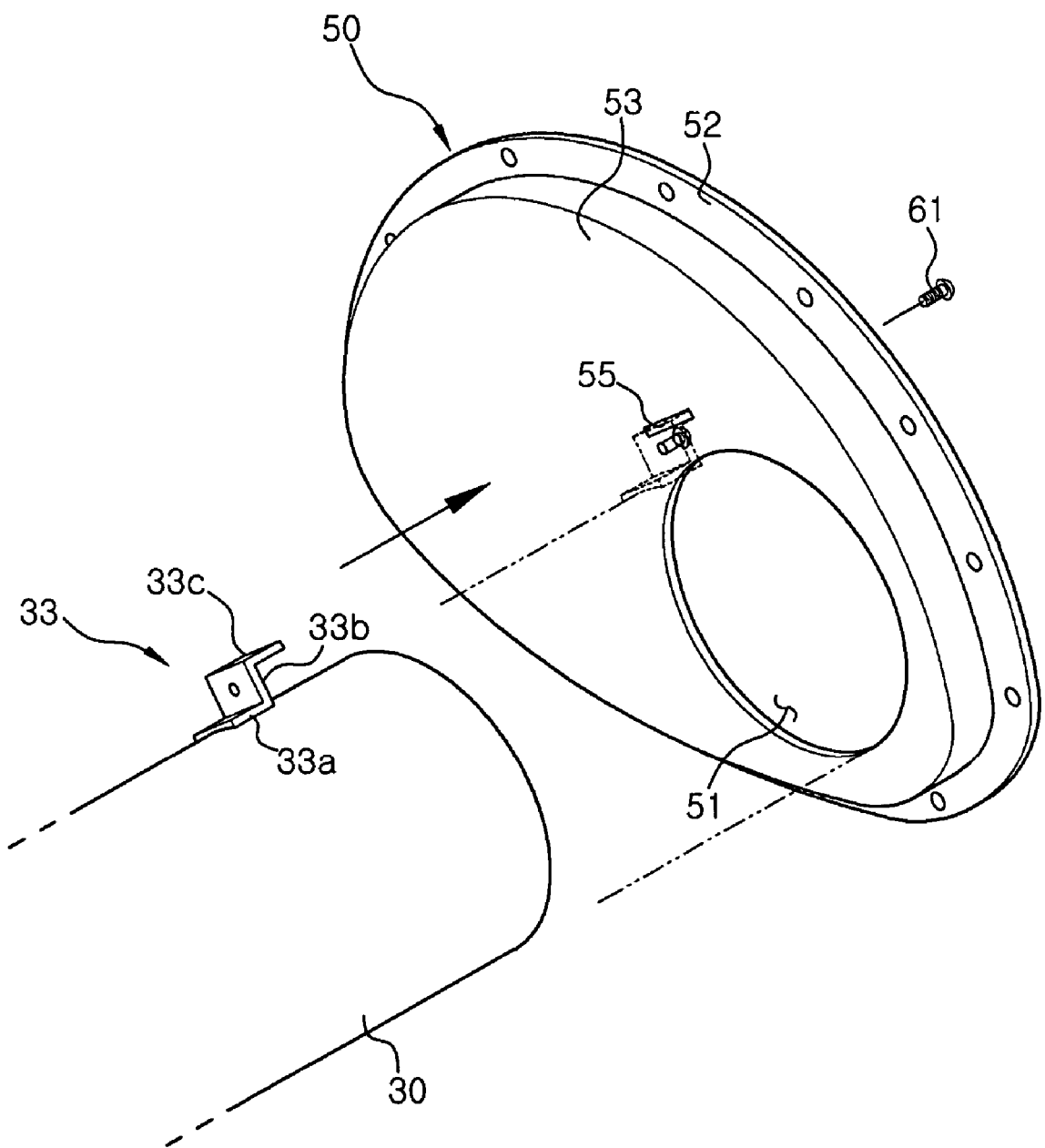

FIG. 2 is a side view, in section, showing the clothing dryer of FIG. 1. In the housing 10 is mounted a cylindrical drying tub 20, as is shown in FIG. 2. The drying tub 20 is supported by respective front and rear brackets 21 and 23, which respectively slidably support the inner circumferences of the front and rear ends of the drying tub 20. Between the drying tub 20 and the front bracket 21 and between the drying tub 20 and the rear bracket 23 are disposed sliding pads 43 to facilitate the rotary movement of the drying tub 20.

At the upper part of the rear bracket 23 is formed an inlet hole 24, through which hot air is introduced into the drying tub 20. At the rear of the rear bracket 23 is disposed an inlet duct 25 that guides hot air to the inlet hole 24. The inlet duct 25 extends rearward from below the drying tub 20, and is then bent upward such that the inlet duct 25 communicates with the inlet hole 24. At the entrance of the inlet duct 25 is disposed a heater 26 that heats air in the housing 10.

At the center of the front bracket 21 is formed an opening, through which clothing to be dried is put into the drying tub 20 from the door 11. At the lower part of the front bracket 21 is formed an outlet hole 22, through which air containing moisture evaporated from the clothing to be dried is discharged out of the drying tub 20.

Below the drying tub 20 are disposed an outlet duct 27, a blowing fan 28, and an exhaust pipe 30, by which air having passed though the outlet hole 22 is discharged out of the clothing dryer. The outlet duct 27 guides the air having passed through the outlet hole 22 to the lower part of the housing 10. The outlet duct 27 is connected to the blowing fan 28 that generates a blowing force necessary to forcibly blow air in the clothing dryer. Air blown by the blowing fan 28 is discharged out of the clothing dryer through the exhaust pipe 30, which has one end connected to a fan casing 29 of the blowing fan 28 and the other end extending out of the housing 10.

At the lower part of the housing 10 is disposed a driving motor 40 that drives the blowing fan 28 and the drying tub 20 and is capable of simultaneously driving the blowing fan and the drying tub. The driving motor 40 has a driving shaft extending toward the front and rear of the driving motor 40. One end of the driving shaft is connected to the blowing fan 28, and the other end of the driving shaft is connected to a pulley 41 that drives the drying tub 20. The pulley 41 is connected to the drying tub 20 by a belt 44 to rotate the drying tub 20 as the driving motor 40 is operated.

The operation of the clothing dryer with the above-described construction according to the present embodiment will now be described.

When clothing to be dried, for example, wet clothing, is put into the drying tub 20 through the door 11, and then drying operation is carried out by the control unit 12, the driving motor 40 simultaneously rotates the drying tub 20 and the blowing fan 28.

As the drying tub 20 is rotated, the clothing to be dried is jumbled together such that the clothing can be uniformly dried. As the blowing fan 28 is rotated, air in the drying tub 20 is discharged out of the clothing dryer through the outlet duct 27 and the exhaust pipe 30. At this time, air in the housing 10 is supplied, through the inlet duct 25, to the drying tube 20 having lowered pressure created therein due to the discharged air, whereby the pressure in the drying tube 20 is compensated for. The air introduced into the drying tub 20 is heated while passing through the heater 26. Moisture contained in the clothing is evaporated by the hot air, which has been heated by the heater 26. In this way, the clothing is dried.

The exhaust pipe fixing structure of the clothing dryer will be described hereinafter in more detail.

The exhaust pipe 30 is formed in the shape of a cylinder of which front and rear ends are open. The front end of the exhaust pipe 30 is supportably inserted in a locating part 29a formed at the exit of the fan casing 29 of the blowing fan 28. The middle part of the exhaust pipe 30 is fixed to the bottom of the housing 10 by a first fixing bracket 31 mounted to the outer circumference of the exhaust pipe 30. Specifically, one end of the first fixing bracket 31 is attached to the exhaust pipe 30. At the bottom of the housing 10 is disposed a second fixing bracket 32 having a latching groove 32c formed such that the first fixing bracket 31 can be fitted in the latching groove 32c of the second fixing bracket 32. The first fixing bracket 31 includes: an attachment part 31a attached to the outer circumference of the exhaust pipe 30; an extension part 31b extending from the attachment part 31a in the radial direction of the exhaust pipe 30; and a latching part 31c bent rearward from the end of the extension part 31b such that the latching part 31c can be fitted in the latching groove 32c of the second fixing bracket 32. The second fixing bracket 32 is provided at the lower end thereof with an attachment part 32a, which is bent in parallel with the bottom of the housing 10 such that the attachment part 32a is attached to the bottom of the housing 10 by a fixing member. From the attachment part 32a of the second fixing bracket 32 extends an extension part 32b, which is perpendicular to the bottom of the housing 10. The latching groove 32c is formed at the extension part 32b. The latching groove 32c is formed such that the latching groove 32c penetrates the extension part 32b from one side edge of the extension part 32b toward the other side edge of the extension part 32b. The latching groove 32c extends in the rotating direction of the latching part 31c of the first fixing bracket 31 such that the latching part 31c is fitted into or separated from the latching groove 32c as the exhaust pipe is rotated clockwise or counterclockwise.

At the rear end of the exhaust pipe 30 is disposed a third fixing bracket 33, which is attached to the rear surface of the housing 10. The third fixing bracket 33 includes: an attachment part 33a attached to the outer circumference of the exhausting pipe 30; an extension part 33b extending from the attachment part 33a in the radial direction of the exhaust pipe 30; and a protrusion part 33c bent from the end of the extension part 33b such that the protrusion part 33c can be protruded toward the rear surface of the housing 10.

At the lower part of the rear surface of the housing 10 is formed an opening 13 having a specified size, which is closed by a rear cover 50 attached to the rear surface of the housing 10. The opening 12 is disposed near the rear end of the exhaust pipe 30. At the rear cover 50 is formed an exhaust pipe hole 51, through which the exhaust pipe 30 is inserted. At a specified position of the rear cover 50, which is spaced apart from the exhaust pipe hole 51, is formed a fixing hole 55, in which the protrusion part 33c of the third fixing bracket 33 is fitted to prevent the exhaust pipe 30 from being rotated. To the rear cover 50 between the exhaust pipe hole 51 and the fixing hole 55 is attached a fixing screw 61, by which the extension part 33b of the third fixing bracket 33 is fixed to the rear cover 50. The rear cover 50 covers the edge of the opening 13 from the outside of the housing 10. At a specified position of the rear cover 50 where the rear cover 50 is attached to the rear surface of the housing 10 are formed a plurality of screw holes. Similarly, another plurality of screw holes are formed at the housing 10 where the rear cover 50 is attached.

The rear cover 50 has a rim 52 that covers the edge of the opening 13 from the outside of the housing 10. At the rim 52 of the rear cover 50 are formed a plurality of screw holes. Similarly, another plurality of screw holes are formed at the housing 10 where the rim 52 is attached. Consequently, the rear cover 50 is fixedly attached to the housing 10 by screws 60 fitted though the screw holes formed at the rim 52 of the rear cover 50 and the housing 10. The rim 52 of the rear cover 50 is protruded rearward as compared to a central part 53 of the rear cover 50.

When the exhaust pipe 30 is to be assembled, the front end of the exhaust pipe 30 is inserted into the locating part 29a of the fan casing 29, and then the exhaust pipe 30 is rotated such that the latching part 31c of the first fixing bracket 31 is fitted into the latching groove 32c of the second fixing bracket 32. In this way, the exhaust pipe is fixed to the bottom of the housing 10 without using an additional fixing member. Thereafter, the rear cover is attached to the rear surface of the housing 50, and the third fixing bracket 33 is attached to the rear cover 50. In this way, the assembly operation of the exhaust pipe is accomplished. After the exhaust pipe is assembled, the protrusion part 33c of the third fixing bracket 33 is fitted in the fixing hole 55 of the rear cover 50. When the exhaust pipe is not correctly assembled, the protrusion part 33c is not fitted in the fixing hole 55. Consequently, it is easily confirmed whether the exhaust pipe is correctly assembled or not.

When the exhaust pipe 30 is to be disassembled, the fixing screw 61 is removed from the rear cover 50, and then the rear cover 50 is separated from the housing 10. Subsequently, the exhaust pipe 30 is rotated in the direction opposite to the exhaust pipe assembling direction, by which the first fixing bracket 31 is separated from the second fixing bracket 32. Finally, the exhaust pipe 30 is pulled rearward with the result that the front end of the exhaust pipe 30 is separated from the locating part 29a. In this way, the exhaust pipe 30 is disassembled.

The described embodiment of the present invention provides a clothing dryer having a first fixing bracket attached to the outer circumference of an exhausting pipe and a second fixing bracket attached to the bottom of a housing, wherein the first fixing bracket is provided with a latching part, and the second fixing bracket is provided with a latching groove, in which the latching part of the first fixing bracket is fitted, whereby the exhaust pipe is fixed to the housing without using an additional fixing member. Consequently, the present invention has the effect of easily assembling and disassembling the exhaust pipe.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A clothing dryer comprising:
   a housing having an opening at a lower portion of a rear surface thereof;
   an exhaust pipe having a longitudinal axis extending in a lengthwise direction of at least a portion of the exhaust pipe;
   a rear cover attached to the rear surface of the housing to close the opening and having an exhaust pipe hole through which the exhaust pipe is inserted, and a fixing hold formed adjacent to the exhaust pipe hole;
   a first fixing bracket disposed at the exhaust pipe, the first fixing bracket including a latching part extending in the direction;
   a second fixing bracket including a latching groove that receives the latching part; and
   a third fixing bracket disposed at an end of the exhaust pipe, the third fixing bracket having an attachment part attached to the outer circumference of the exhaust pipe, an extension part extending from the attachment part in the radial direction of the exhaust pipe, a protrusion part extending from a radially outward end of the extension part such that the protrusion part protrudes toward a rear surface of the housing along an axial direction of the exhaust pipe,
   wherein the protrusion part extends through a fixing hole formed at the rear cover when the latching part is received by the latching groove and the exhaust pipe is assembled in a correct position, and
   the rear cover and the extension part have corresponding screw holes for attachment by a fixing screw.

2. The dryer according to claim 1, wherein the first fixing bracket is respectively fitted into or separated from the second fixing bracket as the exhaust pipe is rotated about the axis thereof in first and second directions.

3. The dryer according to claim 2, wherein the latching groove is formed in the rotating direction of the latching part.

4. The dryer according to claim 3, wherein the first fixing bracket includes: an attachment part attached to the outer circumference of the exhaust pipe; and an extension part extending from the attachment part in the radial direction of the exhaust pipe, and the latching part is bent from the end of the extension part.

5. The dryer according to claim 3, wherein the second fixing bracket includes: an attachment part attached to the bottom of the housing; and an extension part extending upward from the attachment part, and the latching groove is formed at the extension part.

* * * * *